United States Patent
Hayakawa et al.

(10) Patent No.: US 8,731,783 B2
(45) Date of Patent: May 20, 2014

(54) OPEN/CLOSE ACTUATING MECHANISM CONTROL DEVICE AND OPEN/CLOSE ACTUATING MECHANISM CONTROL METHOD FOR VEHICLE

(75) Inventors: Shunsuke Hayakawa, Chiryu (JP); Toshiro Maeda, Anjo (JP); Hitoshi Takayanagi, Kariya (JP); Yoshimasa Asano, Kariya (JP); Takashi Kawato, Anjo (JP); Morio Sakai, Toyota (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/005,682

(22) PCT Filed: Mar. 12, 2012

(86) PCT No.: PCT/IB2012/000459
§ 371 (c)(1),
(2), (4) Date: Sep. 17, 2013

(87) PCT Pub. No.: WO2012/127292
PCT Pub. Date: Sep. 27, 2012

(65) Prior Publication Data
US 2014/0005897 A1    Jan. 2, 2014

(30) Foreign Application Priority Data
Mar. 18, 2011 (JP) ................. 2011-061330

(51) Int. Cl.
*B60R 22/00* (2006.01)
(52) U.S. Cl.
USPC .......................................................... 701/49
(58) Field of Classification Search
None
See application file for complete search history.

(56) References Cited

U.S. PATENT DOCUMENTS

| 4,779,577 | A | 10/1988 | Ritter et al. |
| 2008/0073920 | A1* | 3/2008 | Knauer ..................... 293/115 |
| 2011/0118931 | A1* | 5/2011 | Kawato ..................... 701/30 |
| 2013/0086839 | A1* | 4/2013 | Klop ............................ 49/1 |

FOREIGN PATENT DOCUMENTS

| EP | 2 233 341 A1 | 9/2010 |
| EP | 2 248 693 A2 | 11/2010 |
| FR | 2 941 894 A1 | 8/2010 |

(Continued)

OTHER PUBLICATIONS

International Search Report and Written Opinion for corresponding International Patent Application No. PCT/IB2012/000459 mailed Sep. 4, 2012.

*Primary Examiner* — Thomas Tarcza
*Assistant Examiner* — Adam Alharbi
(74) *Attorney, Agent, or Firm* — Sughrue Mion, PLLC (57) ABSTRACT

An open/close actuating mechanism control device for a vehicle includes: an actuating mechanism (24, 30) that is exposed to outside air and that opens or closes on the basis of whether a predetermined condition is satisfied; an open/close failure determining unit (32) that determines whether an open/close failure of the actuating mechanism (24, 30), in which the actuating mechanism (24, 30) fails to open or close, has occurred; an outside air temperature detecting unit (26, 32) that detects an outside air temperature; and a determination timing changing unit (32) that changes timing, at which the open/close failure determining unit (32) determines that the open/close failure of the actuating mechanism (24, 30) has occurred, on the basis of the outside air temperature detected by the outside air temperature detecting unit (26, 32).

8 Claims, 6 Drawing Sheets

(56) References Cited

FOREIGN PATENT DOCUMENTS

| FR | 2 943 001 A1 | 9/2010 |
| JP | 63-041617 A | 2/1988 |
| JP | 2010-163075 A | 7/2010 |
| JP | 2010-247819 A | 11/2010 |

* cited by examiner

OPEN/CLOSE ACTUATING MECHANISM CONTROL DEVICE AND OPEN/CLOSE ACTUATING MECHANISM CONTROL METHOD FOR VEHICLE

BACKGROUND OF THE INVENTION

1. Field of the Invention

The invention relates to an open/close actuating mechanism control device and open/close actuating mechanism control method for a vehicle and, more particularly, to an open/close actuating mechanism control device and open/close actuating mechanism control method for a vehicle, which detect an open/close failure of an actuating mechanism that is exposed to outside air and that opens or closes on the basis of whether a predetermined condition is satisfied.

2. Description of Related Art

In an existing art, there is known an open/close actuating mechanism control device for a vehicle, in which a grill shutter is arranged at a vehicle body grill in terms of improvement of the aerodynamic performance, fuel economy performance, and the like, of the vehicle (for example, see Japanese Patent Application Publication No. 2010-163075 (JP-A-2010-163075)). The grill shutter is opened or closed in order to allow or interrupt introduction of air into a radiator on the basis of whether a predetermined condition is satisfied. For example, the grill shutter is opened or closed in order to improve fuel economy by ensuring appropriate cooling effect on the basis of the fluid and coolant temperatures and running speed of the vehicle.

Generally, an actuating mechanism that is exposed to outside air and that opens or closes on the basis of whether a predetermined condition is satisfied, as in the case of the above described grill shutter, may lock up against an open or close request. Factors that cause the actuating mechanism to lock up include a failure of a motor or mechanism that opens or closes the actuating mechanism, a break or short-circuit of motor wiring, entrapment of foreign matter, freezing of the motor or mechanism due to a decrease in outside air temperature, and the like. A failure of the motor or mechanism, and the like, remains unless the motor or the mechanism is repaired, the motor wiring is replaced or foreign matter is removed, while freezing of the motor or mechanism may be resolved by an increase in outside air temperature, warming-up, or the like. If it is determined whether an open/close failure of the actuating mechanism has occurred on the basis of a state where the actuating mechanism locks up against an open/close request on the basis of a uniform criterion without distinguishing the above described factors from one another, a determination that an open/close failure is occurring in the actuating mechanism is frequently made while the motor or the mechanism is frozen, so a notification of an open/close failure of the actuating mechanism is frequently provided to a vehicle passenger in cold climate areas, or the like, and the vehicle passenger may feel bothersome.

SUMMARY OF THE INVENTION

The invention provides an open/close actuating mechanism control device and open/close actuating mechanism control method for a vehicle, which prevent an erroneous determination that an open/close failure of an actuating mechanism is occurring while the actuating mechanism locks up because of a decrease in outside air temperature.

A first aspect of the invention relates to an open/close actuating mechanism control device for a vehicle. The open/close actuating mechanism control device includes: an actuating mechanism that is exposed to outside air and that opens or closes on the basis of whether a predetermined condition is satisfied; an open/close failure determining unit that determines whether an open/close failure of the actuating mechanism, in which the actuating mechanism fails to open or close, has occurred; an outside air temperature detecting unit that detects an outside air temperature; and a determination timing changing unit that changes timing, at which the open/close failure determining unit determines that the open/close failure of the actuating mechanism has occurred, on the basis of the outside air temperature detected by the outside air temperature detecting unit.

A second aspect of the invention relates to an open/close actuating mechanism control method for a vehicle. The open/close actuating mechanism control method includes: determining whether an open/close failure of an actuating mechanism in which the actuating mechanism fails to open or close, wherein the actuating mechanism is exposed to outside air and the actuating mechanism opens or closes on the basis of whether a predetermined condition is satisfied; detecting an outside air temperature; and changing timing, at which it is determined that the open/close failure of the actuating mechanism has occurred, on the basis of the detected outside air temperature.

With the above configurations, it is possible to prevent an erroneous determination that an open/close failure of an actuating mechanism is occurring while the actuating mechanism locks up because of a decrease in outside air temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, specific embodiments of the open/close actuating mechanism control device for a vehicle according to the aspect of the invention will be described with reference to the accompanying drawings.

Figure 1:
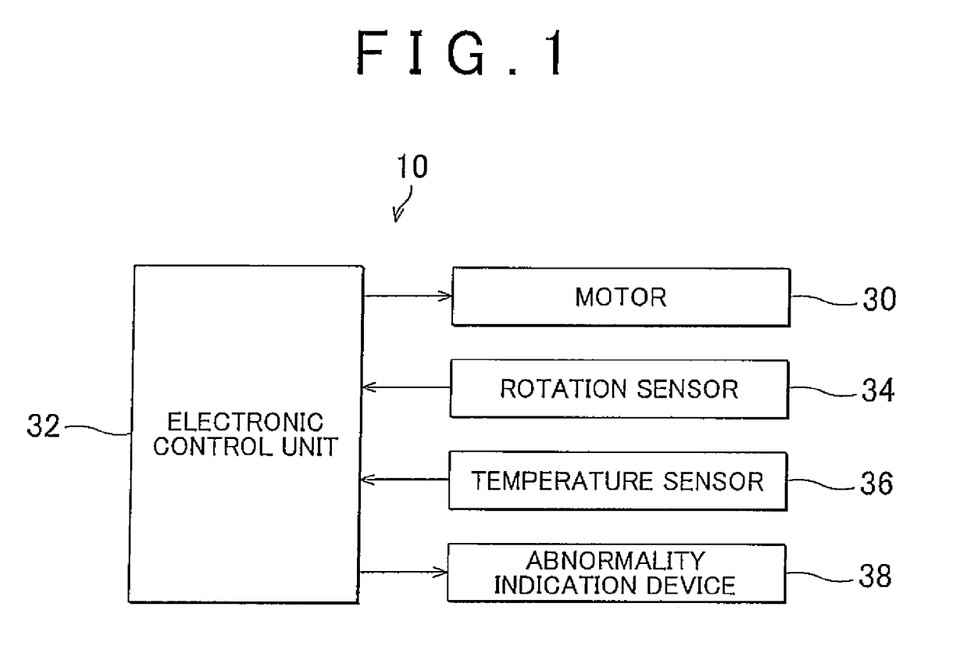
FIG. 1 is a configuration diagram of an open/close actuating mechanism control device for a vehicle according to a first embodiment of the invention.
Figure 2A:
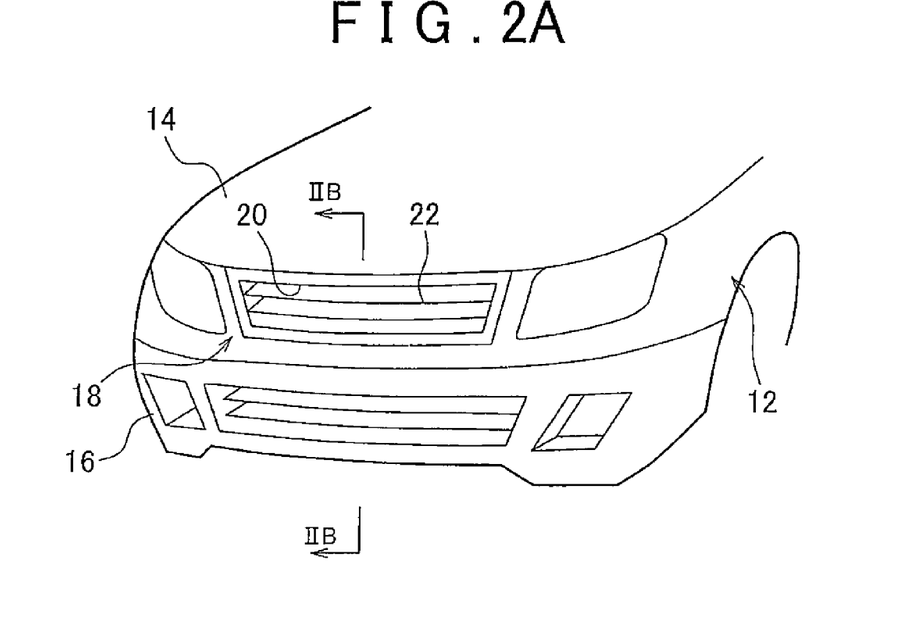
FIG. 2A and FIG. 2B are schematic configuration diagrams of a vehicle body front portion of a vehicle equipped with the open/close actuating mechanism control device according to the first embodiment.
Figure 2B:
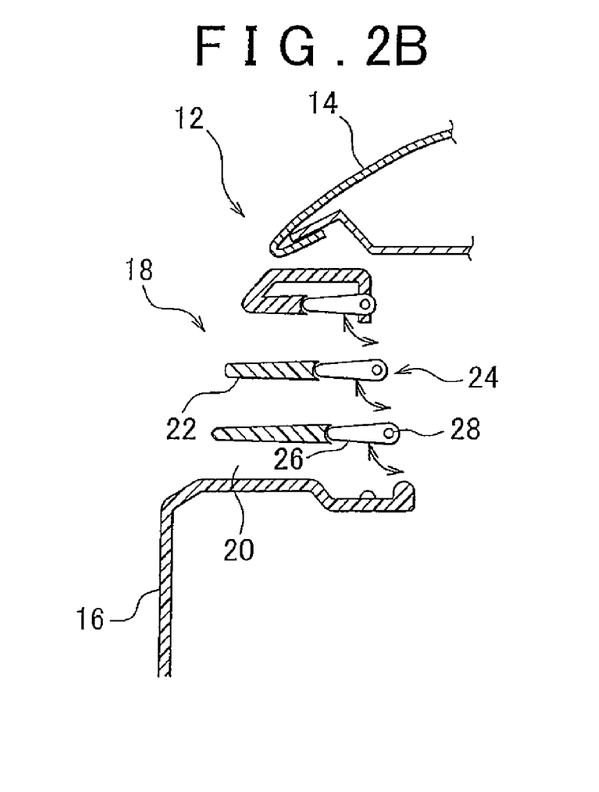

FIG. 1 shows the configuration diagram of an open/close actuating mechanism control device 10 for a vehicle according to the first embodiment of the invention. In addition, FIG. 2A and FIG. 2B show the schematic configuration diagrams of the vehicle body front portion of a vehicle 12 equipped with the open/close actuating mechanism control device 10 according to the present embodiment. FIG. 2A shows the perspective view of the front portion of the vehicle body. FIG. 2B shows the cross-sectional view of the vehicle body front portion, taken along the line IIB-IIB in FIG. 2A.

In the present embodiment, the vehicle 12 includes a radiator grill 18. The radiator grill 18 is provided between an engine hood 14 and a front bumper 16. Inside the engine hood 14, an engine, a cooling fan and a radiator are arranged. The front bumper 16 constitutes the front portion of the vehicle body. The radiator grill 18 is arranged on the front side of the engine and radiator. The radiator grill 18 has an opening portion 20 for introducing outside air into an engine room or toward the radiator. Note that the radiator grill 18 may be an upper grill that is arranged near the front end of the engine hood 14 as shown in FIG. 2A, and, instead of or in addition, to the upper grill, the radiator grill 18 may be a lower grill that is formed integrally with the front bumper 16 below the upper grill.

The opening portion 20 is partitioned by grill grating portions 22 in a grating manner. As shown in FIG. 2A, the grill grating portions 22 may be a plurality of plates that extend in the vehicle body widthwise direction and that are arranged so as to be aligned in the vehicle body vertical direction. By so doing, openings that constitute the opening portion 20 may be formed in a horizontally long shape so as to extend in the vehicle body widthwise direction. Instead, the grill grating portions 22 may be a plurality of plates that extend in the vehicle body vertical direction and that are arranged so as to be aligned in the vehicle body widthwise direction. By so doing, openings that constitute the opening portion 20 may be formed in a vertically long shape so as to extend in the vehicle body vertical direction.

A grill shutter 24 is provided near the opening portion 20 of the radiator grill 18. The grill shutter 24 is configured to open or close the opening portion 20. The grill shutter 24 is arranged so as to face outside the vehicle 12, and is exposed to outside air. The grill shutter 24 has pivotal blades 26. The pivotal blades 26 respectively have the sizes of the openings that constitute the opening portion 20. Each of the pivotal blades 26 is configured to pivot about a shaft 28 that extends in the vehicle body widthwise direction. The pivotal blades 26 pivot in synchronization with one another to change between an open state (open position) and closed state (closed position) of the opening portion 20. Note that FIG. 2B shows the open state of the opening portion 20.

The open/close actuating mechanism control device 10 includes a motor 30 that is connected to the shafts 28 of the pivotal blades 26. The motor 30 is an electric motor that generates driving force for pivoting the pivotal blades 26. The motor 30 drives the pivotal blades 26 to pivot in synchronization with one another using the generated driving force. The driving force of the motor 30 is transmitted to the pivotal blades 26 via the shafts 28 to thereby pivot the pivotal blades 26 in synchronization with one another between the open position and the closed position.

An electronic control unit (referred to as ECU) 32 is electrically connected to the motor 30. The ECU 32 has the function of controlling driving force generated by the motor 30, and controls the motor 30 to open or close the opening portion 20. The ECU 32, for example, determines whether outside air needs to be introduced into the engine room, the radiator, and the like, while the vehicle is running. Then, when the ECU 32 determines that outside air does not need to be introduced, the ECU 32 sets the target position of the pivotal blades 26 at the closed position and issues a close command to request to close the grill shutter 24 to the motor 30; whereas, when the ECU 32 determines that outside air needs to be introduced, the ECU 32 sets the target position of the pivotal blades 26 at the open position and issues a open command to request to open the grill shutter 24 to the motor 30. The motor 30 generates driving force for pivoting the pivotal blades 26 from the open position to the closed position or driving force for pivoting the pivotal blades 26 from the closed position to the open position in accordance with an open/close command from the ECU 32.

As the motor 30 generates driving force for pivoting the pivotal blades 26 from the open position to the closed position in accordance with an close command from the ECU 32, the pivotal blades 26 are pivoted from the open position to the closed position about the respective shafts 28, so the grill shutter 24 is closed to close the opening portion 20 of the radiator grill 18. In this case, introduction of outside air into the engine room, the radiator, and the like, is interrupted, so the temperature of the engine may be quickly increased, for example, when the engine is cold. In addition, as the motor 30 generates driving force for pivoting the pivotal blades 26 from the closed position to the open position in accordance with an open command from the ECU 32, the pivotal blades 26 are pivoted from the closed position to the open position about the respective shafts 28, so the grill shutter 24 is opened to open the opening portion 20 of the radiator grill 18. In this case, because outside air is introduced into the engine room, the radiator, and the like, the engine and the radiator that increase in temperature while the vehicle is running may be cooled by running wind.

A rotation sensor 34 is electrically connected to the ECU 32. The rotation sensor 34 outputs a signal corresponding to a rotation speed at which the motor 30 actually rotates. The signal output from the rotation sensor 34 is supplied to the ECU 32. The ECU 32 detects the rotation speed, at which the motor 30 actually rotates, on the basis of the signal output from the rotation sensor 34, and determines whether the motor 30 is in a locked condition where the motor 30 does not operate in response to an open/close command on the basis of the detected rotation speed.

A temperature sensor 36 is also electrically connected to the ECU 32. The temperature sensor 36 outputs a signal corresponding to an outside air temperature. The temperature sensor 36 is arranged at a vehicle body portion that rarely receives the influence of engine exhaust heat, running wind, or the like (for example, the back side of the front bumper 16 or the back side of the radiator grill 18, or the like). The temperature sensor 36 may be an exclusive component, or may employ a component that is used in engine control, or the like. The signal output from the temperature sensor 36 is supplied to the ECU 32. The ECU 32 detects the outside air temperature outside the vehicle 12 on the basis of the signal output from the temperature sensor 36.

Furthermore, an abnormality indication device 38 is electrically connected to the ECU 32. The abnormality indication device 38 visually informs a passenger (particularly, a vehicle driver) of various abnormalities, and is, for example, arranged in a combination meter of an instrument panel or in a multi-information meter. When the ECU 32 determines that the grill shutter 24 is in an open/close failure condition (that is, the grill shutter 24 is stuck) because the motor 30 is in the above locked condition as described in detail later, the ECU 32 issues a command to request to indicate that an open/close failure (abnormal stuck) has occurred in the grill shutter 24 to the abnormality indication device 38. The abnormality indication device 38 indicates that an open/close failure is occurring in the grill shutter 24 in accordance with the indication command from the ECU 32.

Figure 3:
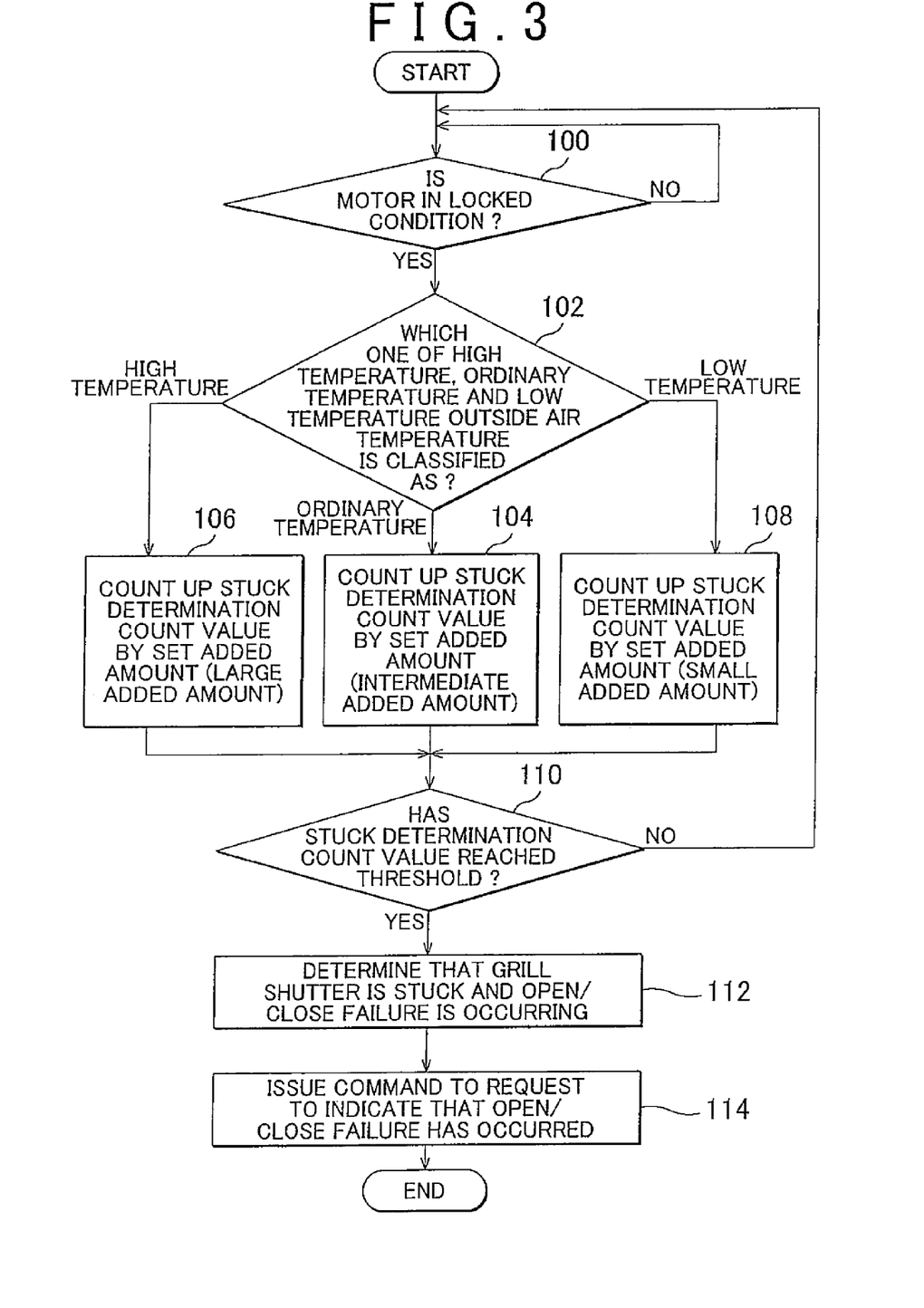
FIG. 3 is a flow chart of an example of control routine executed by the open/close actuating mechanism control device for a vehicle according to the first embodiment.
Figure 4:
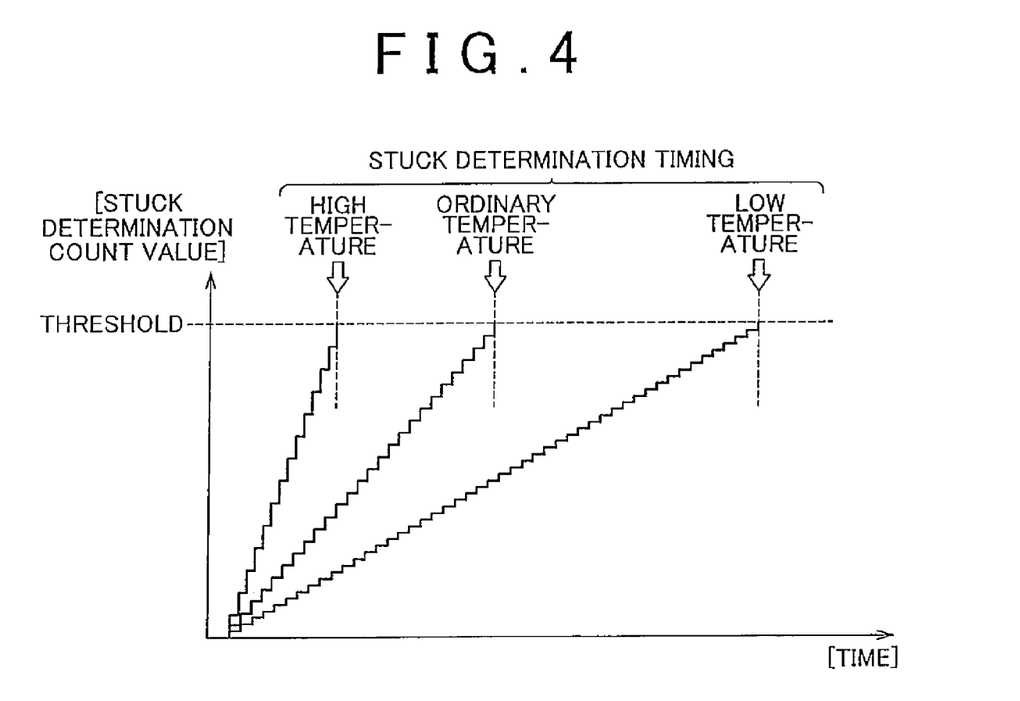
FIG. 4 is a graph for illustrating a method of determining whether an open/close failure of an actuating mechanism is occurring by the open/close actuating mechanism control device for a vehicle according to the first embodiment.

FIG. 3 shows a flow chart of an example of control routine executed by the ECU 32 in the open/close actuating mechanism control device 10 according to the present embodiment. In addition, FIG. 4 shows a graph for illustrating a method of determining whether an open/close failure of the grill shutter 24 is occurring by the open/close actuating mechanism control device 10 according to the present embodiment.

In the present embodiment, while the ECU 32 is issuing an open/close command to request for the motor 30 to generate driving force in order to open or close the grill shutter 24, the ECU 32 detects the rotation speed, at which the motor 30 actually rotates, on the basis of the signal output from the rotation sensor 34 at that time, point at predetermined time intervals and determines whether the motor 30 is in a locked condition on the basis of the detected rotation speed (step 100). As a result, when the ECU 32 determines that the motor 30 is not in a locked condition because the rotation speed of the motor 30 varies by a relatively large amount, the ECU 32 repeatedly executes the process of step 100 thereafter.

On the other hand, when the ECU 32 determines that the motor 30 is in a locked condition because the rotation speed of the motor 30 almost does not vary as a result of the process of step 100, the ECU 32 subsequently determines which one of high temperature, ordinary temperature and low temperature the outside air temperature detected on the basis of the signal output from the temperature sensor 36 at that time point is classified as (step 102). The "high temperature" is a temperature at which the motor 30 does not lock up because of freezing, and is, for example, higher than or equal to 5° C. The "low temperature" is a temperature at which the motor 30 is highly likely to lock up because of freezing, and is, for example, lower than or equal to −5° C. In addition, the "ordinary temperature" is a temperature between the high temperature and the low temperature.

The ECU 32 stores a count value (hereinafter, referred to as stuck determination count value) that is counted up in order to determine whether an open/close failure is occurring in the grill shutter 24 when the motor 30 is in a locked condition. For example, when it is determined that the motor 30 is not in a locked condition, when the situation that the motor 30 is not in a locked condition has lasted for a predetermined period of time or when open/close operation of the grill shutter 24 is stopped, the stuck determination count value is reset. When the ECU 32 determines that the motor 30 is in a locked condition as a result of the process of step 100, the stuck determination count value is counted up by an amount based on an outside air temperature as described below. The stuck determination count value increases each time it is determined that the motor 30 is in a locked condition.

Specifically, when the ECU 32 determines that the outside air temperature is ordinary temperature as a result of the process of step 102, the ECU 32 sets an added amount, by which the stuck determination count value is counted up each time it is determined that the motor 30 is in a locked condition, at an intermediate value (third added amount), and counts up the stuck determination count value by the set added amount (step 104).

In addition, when the ECU 32 determines that the outside air temperature is high temperature as a result of the process of step 102, the ECU 32 sets the added amount, by which the stuck determination count value is counted up each time it is determined that the motor 30 is in a locked condition, at a value (second added amount) larger than the intermediate value, and counts up the stuck determination count value by the set added amount (step 106).

In addition, when the ECU 32 determines that the outside air temperature is low temperature as a result of the process of step 102, the ECU 32 sets the added amount, by which the stuck determination count value is counted up each time it is determined that the motor 30 is in a locked condition, at a value (first added amount) smaller than the intermediate value, and counts up the stuck determination count value by the set added amount (step 108).

Then, the ECU 32 determines whether the stuck determination count value counted up in steps 104 to 108 has reached a threshold (step 110). In the present embodiment, the threshold is a predetermined fixed value that is not varied on the basis of an outside air temperature, and is set such that it may be determined that an open/close failure is occurring in the grill shutter 24 when the stuck determination count value has reached the threshold.

When the ECU 32 determines that the stuck determination count value has not reached the threshold as a result of the process of step 110, the ECU 32 repeatedly executes the processes of step 100 and the following steps again. On the other hand, when the ECU 32 determines that the stuck determination count value has reached the threshold, the ECU 32 determines that the grill shutter 24 is stuck and an open/close failure is occurring (step 112). Then, when the ECU 32 determines that an open/close failure is occurring in the grill shutter 24, the ECU 32 issues an indication command to request to indicate the fact that the open/close failure has occurred to the abnormality indication device 38 (step 114). When the abnormality indication device 38 receives the indication command from the ECU 32, the abnormality indication device 38 indicates that an open/close failure is occurring in the grill shutter 24. By so doing, the vehicle passenger is able to be informed of the fact that an open/close failure is occurring in the grill shutter 24.

In this way, in the open/close actuating mechanism control device 10 according to the present embodiment, when a locked condition that the motor 30 does not operate in response to an open/close command lasts, the stuck determination count value is counted up, and, when the stuck determination count value has reached the threshold, it is determined that an open/close failure is occurring in the grill shutter 24. In addition, the added amount, by which the stuck determination count value is counted up when a locked condition that the motor 30 does not operate in response to an open/close command lasts, is varied on the basis of an outside air temperature. Specifically, the added amount is set at a relatively intermediate value when the outside air temperature is ordinary temperature, the added amount is set at a relatively large value when the outside air temperature is high temperature, and the added amount is set at a relatively small value when the outside air temperature is low temperature.

With the above configuration, as the outside air temperature decreases or as a period of time during which the low outside air temperature state lasts elongates, a period of time until the stuck determination count value reaches the threshold is elongated, and, the timing (hereinafter, referred to as open/close failure determination timing), at which the ECU 32 determines that an open/close failure is occurring in the grill shutter when the locked condition of the motor 30 lasts, is delayed.

Specifically, as shown in FIG. 4, the open/close failure determination timing after the motor 30 begins to lock up is set so as to be the earliest when the outside air temperature is high temperature, is set so as to be intermediate when the outside air temperature is ordinary temperature and is set so as to be the latest when the outside air temperature is low temperature. In addition, the open/close failure determination timing is set so as to be earlier as the duration of the low outside air temperature state gets shorter, and is set so as to be later as the duration gets longer.

Thus, with the open/close actuating mechanism control device 10 according to the present embodiment, when the outside air temperature is relatively low and there is a high possibility that the state where the motor 30 locks up because of freezing is continuing, it is harder to determine that an open/close failure is occurring in the grill shutter 24 as compared with when the outside air temperature is relatively high and there is a high possibility that the state where the motor 30 locks up because of a motor failure, or the like, is continuing, so it is possible to prevent an erroneous determination that an open/close failure is occurring in the grill shutter 24 when the motor 30 (that is, grill shutter 24) locks up because of a decrease in the outside air temperature. Thus, it is possible to ensure robustness in terms of determining whether an open/close failure is occurring in the grill shutter 24. Therefore, a determination that an open/close failure is occurring in the grill shutter 24 is not frequently made while the motor is frozen, so a notification that an open/close failure of the grill shutter 24 is not frequently provided by the abnormality indication device 38 to the vehicle passenger in cold climate areas, or the like. Thus, it is possible to prevent the vehicle passenger from feeling bothersome against a notification that an open/close failure is occurring in the grill shutter 24.

In addition, with the above configuration, when the outside air temperature varies in the process until the stuck determination count value reaches the threshold, the added amount by which the stuck determination count value is counted up can be changed with a variation in the outside air temperature. By so doing, the open/close failure determination timing is changed on the basis of not only the outside air temperature at the time when the stuck determination count value reaches the threshold but also the outside air temperature in all the process until the stuck determination count value reaches the threshold, so a determination as to whether an open/close failure of the grill shutter 24 is occurring can be appropriately made in consideration of the outside air temperature in all the process until the stuck determination count value reaches the threshold.

In the above first embodiment, the grill shutter 24 or the motor 30 functions as an actuating mechanism, the processes of steps 110 and 112 in the routine shown in FIG. 3, executed by the ECU 32, function as an open/close failure determining unit, the process of detecting the outside air temperature on the basis of the signal output from the temperature sensor 36, executed by the ECU 32, functions as an outside air temperature detecting unit, the process of changing the added amount by which the stuck determination count value is counted up on the basis of the detected outside air temperature, executed by the ECU 32, functions as a determination timing changing unit, the process of step 100, executed by the ECU 32, functions as a lock determining unit, the process of counting up the stuck determination count value each time it is determined that the motor 30 is in a locked condition, executed by the ECU 32, functions as a count-up unit, and the process of step 114, executed by the ECU 32, functions as an abnormality notification unit. In addition, the stuck determination count value is regarded as an open/close failure count value.

Figure 5:
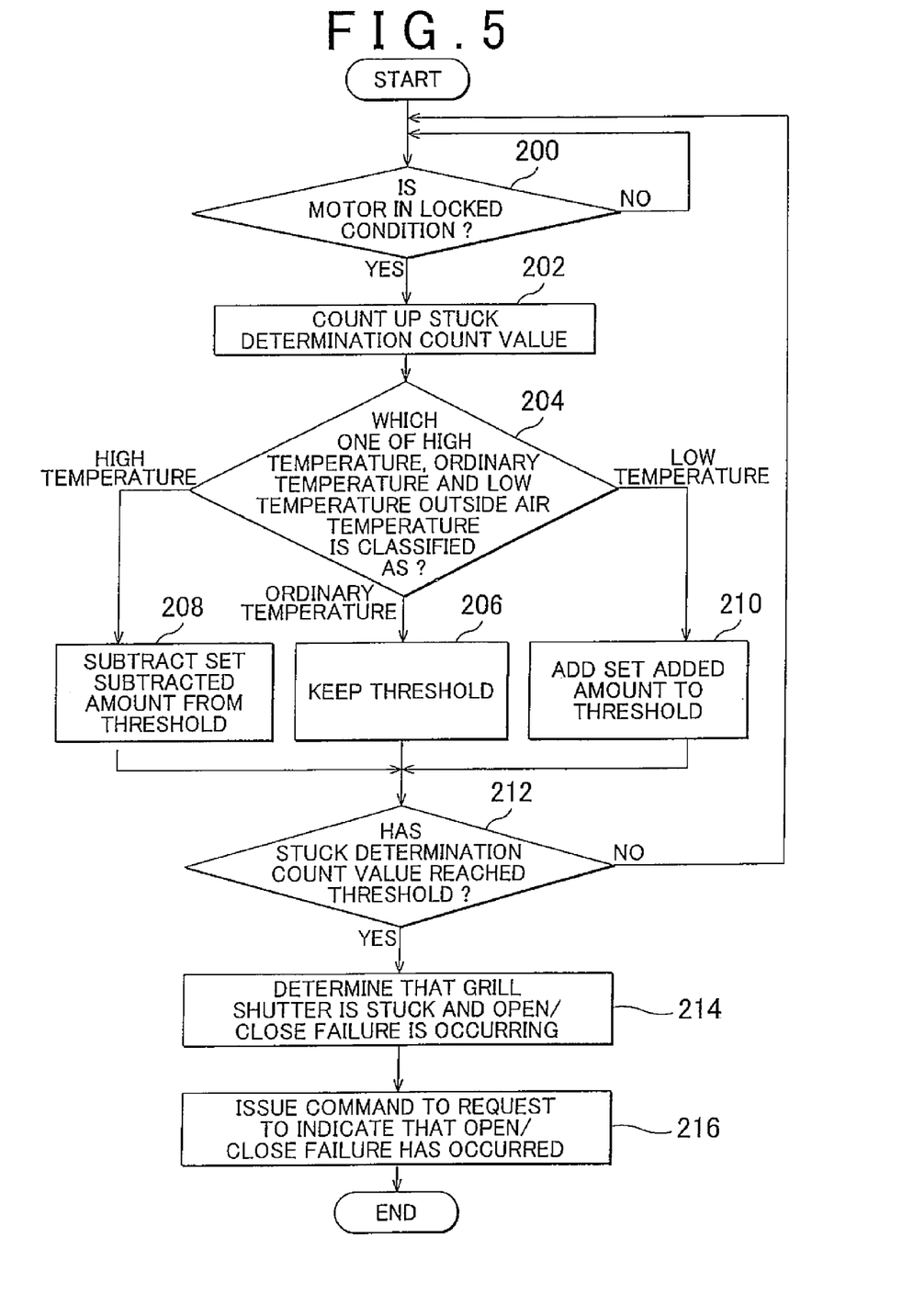
FIG. 5 is a flow chart of an example of control routine executed by an open/close actuating mechanism control device for a vehicle according to a second embodiment of the invention.

An open/close actuating mechanism control device 10 for a vehicle according to a second embodiment of the invention is implemented by causing the ECU 32 to execute the routine shown in FIG. 5 instead of the routine shown in FIG. 3. That is, in the present embodiment, the ECU 32 executes the routine shown in FIG. 5.

Figure 6:
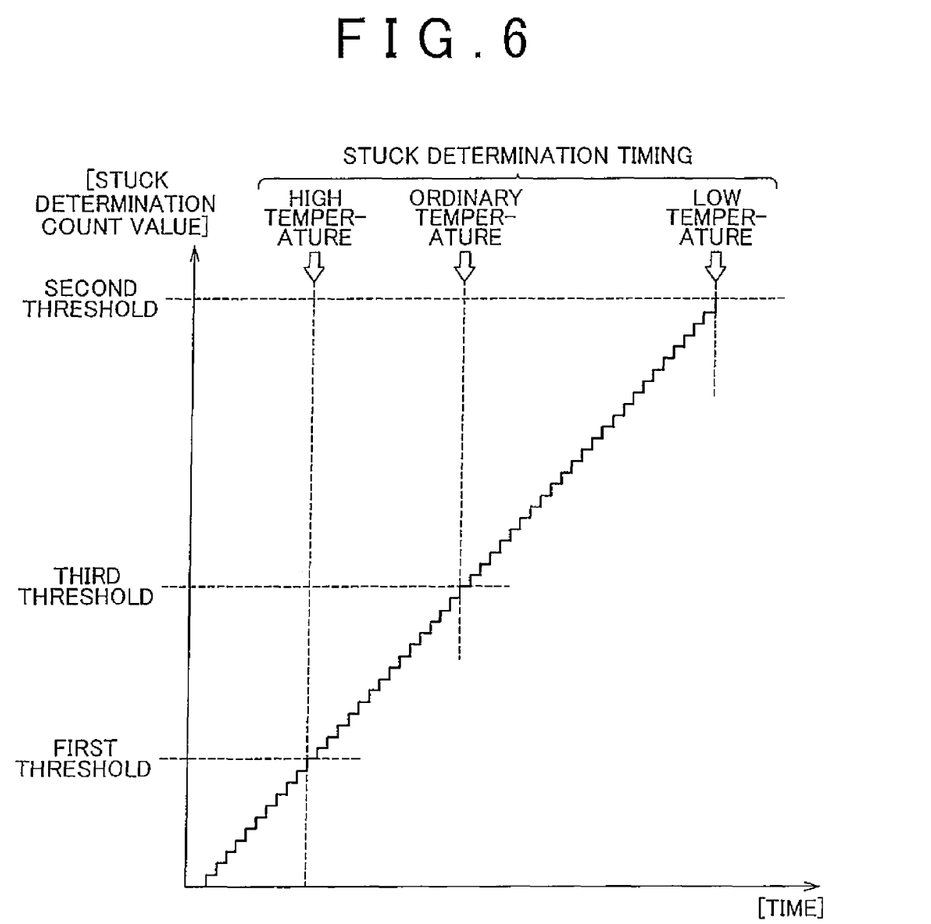
FIG. 6 is a graph for illustrating a method of determining whether an open/close failure of an open/close mechanism is occurring by the open/close actuating mechanism control device for a vehicle according to the second embodiment.

FIG. 5 is a flowchart of an example of control routine executed by the ECU 32 in the open/close actuating mechanism control device 10 according to the present embodiment. In addition, FIG. 6 is a graph for illustrating a method of determining whether an open/close failure of the grill shutter 24 is occurring by the open/close actuating mechanism control device 10 according to the present embodiment.

In the present embodiment, while the ECU 32 is issuing an open/close command to request for the motor 30 to generate driving force in order to open or close the grill shutter 24, the ECU 32 detects the rotation speed at which the motor 30 actually rotates on the basis of the signal output from the rotation sensor 34 at that time at predetermined intervals, and determines whether the motor is in a locked condition on the basis of the detected rotation speed (step 200). As a result, when the ECU 32 determines that the motor 30 is not in a locked condition because the rotation speed of the motor 30 varies by a relatively large amount, the ECU 32 repeatedly executes the process of step 200 thereafter.

On the other hand, when the ECU 32 determines that the motor 30 is in a locked condition because the rotation speed of the motor 30 almost does not vary as a result of the process of step 200, the ECU 32 subsequently counts up a count value (hereinafter, referred to as stuck determination count value) that is counted up in order to determine that an open/close failure is occurring in the grill shutter 24 when the motor 30 is in a locked condition (step 202). For example, when it is determined that the motor 30 is not in a locked condition, when the situation that the motor 30 is not in a locked condition has lasted for a predetermined period of time or when open/close operation of the grill shutter 24 is stopped, the stuck determination count value is reset. In the present embodiment, an added amount by which the stuck determination count value is counted up each time a determination that the motor 30 is in a locked condition is made is a predetermined fixed value that is not varied on the basis of an outside air temperature.

After the ECU 32 counts up the stuck determination count value by the predetermined added amount in step 202, the ECU 32 subsequently determines which one of high temperature, ordinary temperature and low temperature the outside air temperature detected on the basis of the signal output from the temperature sensor 36 at that time point is classified as (step 204). The "high temperature", "low temperature" and "ordinary temperature" are similar classifications as in the case of the first embodiment.

The ECU 32 stores a threshold for determining whether an open/close failure is occurring in the grill shutter 24 on the basis of the above stuck determination count value. It is determined that an open/close failure is occurring in the grill shutter 24 when the stuck determination count value has reached the above threshold. For example, when the stuck determination count value is counted up one by one each time a determination that the motor 30 is in a locked condition is made, it is determined that an open/close failure is occurring in the grill shutter 24 when the number of additions the stuck determination count value is added has reached a predetermined number set as the threshold. The threshold is varied on the basis of the outside air temperature, and the threshold in the case where the state where the ordinary outside air temperature continues is set as an initial value. Specifically, as shown in FIG. 6, the threshold is changed to a first threshold when the high outside air temperature continues, is changed to a second threshold when the low outside air temperature continues and is changed to a third threshold when the ordinary outside air temperature continues.

When the ECU 32 determines that the outside air temperature is ordinary temperature as a result of the process of step 204, the threshold is kept at a current value (step 206). In addition, when the ECU 32 determines that the outside air temperature is high temperature, a subtracted amount that is subtracted from the threshold each time a determination that the motor 30 is in a locked condition is made is set at a predetermined value (predetermined positive number), and subtracts the set subtracted amount from the threshold (step 208). In addition, when the ECU 32 determines that the outside air temperature is low temperature, an added amount that is added to the threshold each time a determination that the motor 30 is in a locked condition is made is set at a predetermined value (predetermined positive number), and adds the set added amount to the threshold (step 210).

Then, the ECU 32 determines whether the stuck determination count value has reached the threshold as a result of the processes of steps 206 to 210 (step 212). Then, when the ECU 32 determines that the stuck determination count value has not reached the threshold, the ECU 32 repeatedly executes the process of step 200 again. On the other hand, when the ECU 32 determines that the stuck determination count value has reached the threshold, the ECU 32 determines that the grill shutter 24 is stuck and an open/close failure is occurring (step 214). Then, when the ECU 32 determines that an open/close failure is occurring in the grill shutter 24, the ECU 32 issues an indication command to request to indicate the fact that the open/close failure has occurred to the abnormality indication device 38 (step 216). When the abnormality indication device 38 receives the indication command from the ECU 32, the abnormality indication device 38 indicates that an open/close failure is occurring in the grill shutter 24. In this case, the vehicle passenger is able to be informed of the fact that an open/close failure is occurring in the grill shutter 24.

In this way, in the open/close actuating mechanism control device 10 according to the present embodiment, when a locked condition that the motor 30 does not operate in response to an open/close command lasts, the stuck determination count value is counted up, and, when the stuck determination count value has reached the threshold, it is determined that an open/close failure is occurring in the grill shutter 24. In addition, the threshold for determining that an open/close failure is occurring in the grill shutter 24 is changed on the basis of the outside air temperature. Specifically, the threshold is kept as it is when the outside air temperature is ordinary temperature, the threshold is subjected to subtraction when the outside air temperature is high temperature and the threshold is subjected to addition when the outside air temperature is low temperature.

With the above configuration, as the outside air temperature decreases or as a period of time during which the low outside air temperature state lasts elongates, a period of time until the stuck determination count value reaches the threshold is elongated, and, the timing (hereinafter, referred to as open/close failure determination timing), at which the ECU 32 determines that an open/close failure is occurring in the grill shutter when the locked condition of the motor 30 lasts, is delayed.

Specifically, as shown in FIG. 6, the open/close failure determination timing after the motor 30 begins to lock up is set so as to be the earliest when the outside air temperature is high temperature, is set so as to be intermediate when the outside air temperature is ordinary temperature and is set so as to be the latest when the outside air temperature is low temperature. In addition, the open/close failure determination timing is set so as to be earlier as the duration of the low outside air temperature state gets shorter, and is set so as to be later as the duration gets longer.

Thus, with the open/close actuating mechanism control device 10 according to the present embodiment, when the outside air temperature is relatively low and there is a high possibility that the state where the motor 30 locks up because of freezing is continuing, it is harder to determine that an open/close failure is occurring in the grill shutter 24 as compared with when the outside air temperature is relatively high and there is a high possibility that the state where the motor 30 locks up because of a motor failure, or the like, is continuing, so it is possible to prevent an erroneous determination that an open/close failure is occurring in the grill shutter 24 when the motor 30 (that is, grill shutter 24) locks up because of a decrease in the outside air temperature. Thus, it is possible to ensure robustness in terms of determining whether an open/close failure is occurring in the grill shutter 24. Therefore, in the present embodiment as well, similar advantageous effects to those of the first embodiment may be obtained.

In addition, with the above configuration, when the outside air temperature varies in the process until the stuck determination count value reaches the threshold, the threshold can be changed with a variation in the outside air temperature. By so doing, the open/close failure determination timing is changed on the basis of not only the outside air temperature at the time when the stuck determination count value reaches the threshold but also the outside air temperature in all the process until the stuck determination count value, reaches the threshold, so a determination as to whether an open/close failure of the grill shutter 24 is occurring can be appropriately made in consideration of the outside air temperature in all the process until the stuck determination count value reaches the threshold.

Note that, in the second embodiment, the processes of steps 212 and 214 in the routine shown in FIG. 5, executed by the ECU 32, function as an open/close failure determining unit, the process of changing the threshold on the basis of the detected outside air temperature, executed by the ECU 32, functions as a determination timing changing unit, the process of step 200, executed by the ECU 32, functions as a lock determining unit, the process of counting up the stuck determination count value by a predetermined added amount each time a determination that the motor 30 is in a locked condition is made, executed by the ECU 32, functions as a count-up unit, and the process of step 216, executed by the ECU 32, functions as an abnormality notification unit. In addition, the stuck determination count value may be regarded as an open/close failure count value.

In addition, in the second embodiment, the threshold is kept as it is when the outside air temperature is ordinary temperature, the threshold is reduced by a predetermined subtracted amount when the outside air temperature is high temperature and the threshold is increased by a predetermined added amount when the outside air temperature is low temperature; however, the aspect of the invention is not limited to this configuration. The threshold just needs to be increased as the outside air temperature decreases. That is, it is also applicable that the threshold is kept as it is when the outside air temperature is high temperature, the threshold is increased by a first added amount when the outside air temperature is ordinary temperature and the threshold is increased by a second added amount that is larger than the first added amount when the outside air temperature is low temperature. Conversely, it is also applicable that the threshold is kept as it is when the outside air temperature is low temperature, the threshold is reduced by a first subtracted amount when the outside air temprature is ordinary temperature and the threshold is reduced by a second subtracted amount that is larger than the first subtracted amount when the outside air temperature is high temperature.

In the first and second embodiments, the actuating mechanism that is provided on a outer portion of the vehicle body and that is exposed to outside air is implemented as the grill shutter 24 that is configured to open or close the opening portion 20 of the radiator grill 18 of the front portion of the vehicle body or the motor 30 used to open or close the grill shutter 24; however, the aspect of the invention is not limited to this configuration. The actuating mechanism just needs to be opened or closed in a state of being provided on the outer portion of vehicle body and exposed to outside air. For example, the aspect of the invention may be applied to a rear spoiler or a front spoiler that improves aerodynamic performance and fuel economy performance. Further, the aspect of the invention may be applied to a door mirror.

The invention claimed is:

1. An open/close actuating mechanism control device for a vehicle, comprising:
    an actuating mechanism that is exposed to outside air and that opens or closes on the basis of whether a predetermined condition is satisfied;
    an open/close failure determining unit that determines whether an open/close failure of the actuating mechanism, in which the actuating mechanism fails to open or close, has occurred;
    an outside air temperature detecting unit that detects an outside air temperature; and
    a determination timing changing unit that changes timing, at which the open/close failure determining unit determines that the open/close failure of the actuating mechanism has occurred, on the basis of the outside air temperature detected by the outside air temperature detecting unit.

2. The open/close actuating mechanism control device according to claim 1, further comprising:
    a lock determining unit that determines at predetermined intervals whether the actuating mechanism locks up against an open/close request for opening or closing; and
    a count-up unit that counts up an open/close failure count value by an added amount each time the lock determining unit determines that the actuating mechanism locks up against the open/close request, wherein
    the open/close failure determining unit determines that the open/close failure of the actuating mechanism has occurred when the open/close failure count value counted up by the count-up unit has reached a threshold, and
    the determination timing changing unit changes the added amount by which the open/close failure count value is counted up by the count-up unit on the basis of the outside air temperature detected by the outside air temperature detecting unit.

3. The open/close actuating mechanism control device according to claim 2, wherein
    the determination timing changing unit reduces the added amount as the outside air temperature detected by the outside air temperature detecting unit decreases.

4. The open/close actuating mechanism control device according to claim 2, wherein
    the determination timing changing unit sets the added amount at a first added amount when the outside air temperature detected by the outside air temperature detecting unit is lower than or equal to a first temperature, sets the added amount at a second added amount that is larger than the first added amount when the outside air temperature detected by the outside air temperature detecting unit is higher than or equal to a second temperature that is higher than or equal to the first temperature, and sets the added amount at a third added amount that is larger than the first added amount and smaller than the second added amount when the outside air temperature detected by the outside air temperature detecting unit is higher than the first temperature and is lower than the second temperature.

5. The open/close actuating mechanism control device according to claim 1, further comprising:
    a lock determining unit that determines at predetermined intervals whether the actuating mechanism locks up against an open/close request for opening or closing; and
    a count-up unit that counts up an open/close failure count value by an added amount each time the lock determining unit determines that the actuating mechanism locks up against the open/close request, wherein
    the open/close failure determining unit determines that the open/close failure of the actuating mechanism has occurred when the open/close failure count value counted up by the count-up unit has reached a threshold, and
    the determination timing changing unit changes the threshold on the basis of the outside air temperature detected by the outside air temperature detecting unit.

6. The open/close actuating mechanism control device according to claim 5, wherein
    the determination timing changing unit increases the threshold as the outside air temperature detected by the outside air temperature detecting unit decreases.

7. The open/close actuating mechanism control device according to claim 1, further comprising:
    an abnormality notification unit that provides a notification that the open/close failure of the actuating mechanism has occurred to a vehicle passenger when the open/close failure determining unit determines that the open/close failure of the actuating mechanism has occurred.

8. An open/close actuating mechanism control method for a vehicle, comprising:
    determining whether an open/close failure of an actuating mechanism, in which the actuating mechanism fails to open or close, has occurred, wherein the actuating mechanism is exposed to outside air and the actuating mechanism opens or closes on the basis of whether a predetermined condition is satisfied;
    detecting an outside air temperature; and
    changing timing, at which it is determined that the open/close failure of the actuating mechanism has occurred, on the basis of the detected outside air temperature.

* * * * *